Feb. 28, 1967 G. M. SPENCE 3,306,961
HARDENING CEMENT MIXTURES
Filed June 14, 1965
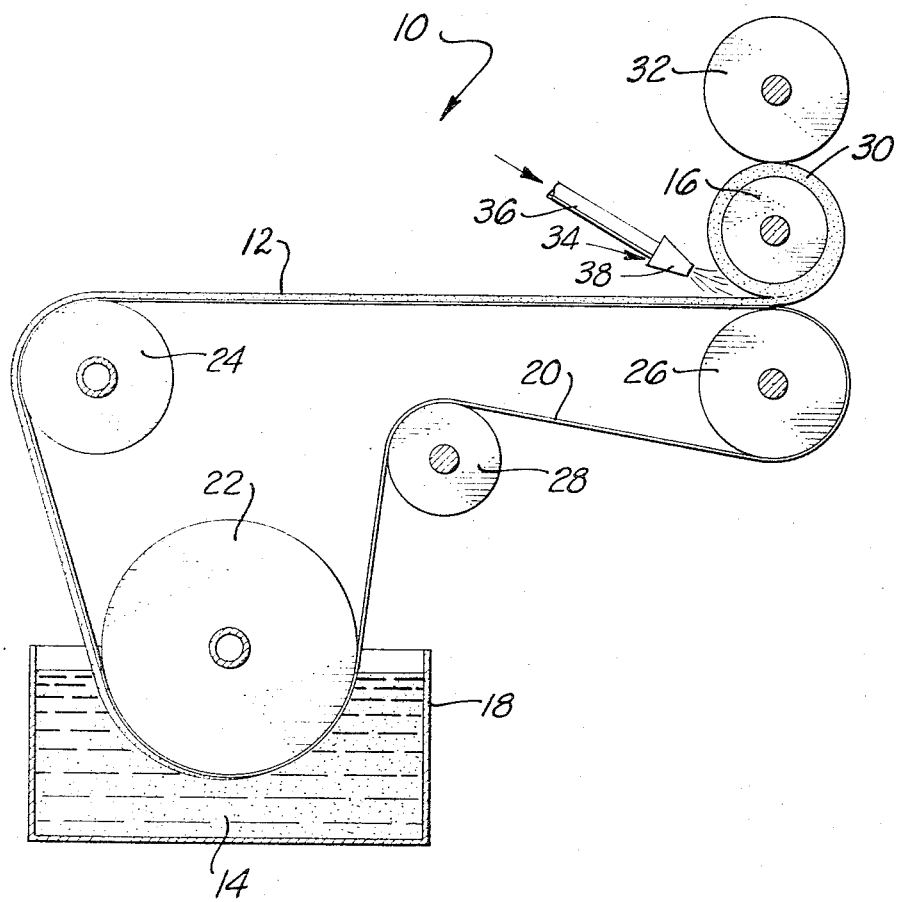
INVENTOR.
GERALD M. SPENCE
BY
EDWARD D. O'BRIAN
ATTORNEY United States Patent Office 3,306,961
Patented Feb. 28, 1967

3,306,961
HARDENING CEMENT MIXTURES
Gerald M. Spence, Tehachapi, Calif., assignor to Monolith Portland Cement Co., Monolith, Calif., a corporation of Nevada
Filed June 14, 1965, Ser. No. 463,837
7 Claims. (Cl. 264—82)

This invention relates to a new and improved method and apparatus for the hardening of cement mixtures. More specifically, it relates to the hardening of Portland cement mixtures which are used in the manufacture of products which are created in a desired shape upon an appropriate form or mandrel.

In the manufacture of so-called "cement" pipe it is conventional to form a mixture or slurry of Portland cement, asbestos and silica, to filter out the solids within such a slurry, and to apply such a solid mixture to an appropriate form or mandrel having the shape of the desired product. After a desired thickness of solids has been placed upon such a form or mandrel it is then normally processed so as to allow at least a significant amount of hydration to occur within the Portland cement present so as to make the article sufficiently rigid that it is capable of being removed from the mandrel. Next, the final product is removed from the mandrel and the Portland cement is allowed to harden, either through normally occurring reactions or under the influence of steam and/or pressure, finishing the desired product except for various secondary type operations such as trimming and machining as required.

A number of different variations of the type of process broadly outlined in the preceding paragraph are, of course, known. Thus, for example, the ingredients within a slurry used in this type of process are frequently varied depending upon the desires of a manufacturer. In any process of this type there are several different significant economic considerations relating to the cost of carrying out the process.

One of these is the problem of "sag." Prior to the hydration of the cement compounds in a solids mixture encountered in this general type of process the mixture has a plastic consistency and character. As a consequence of this, if the solids located upon a mandrel are removed from the mandrel prior to a significant amount of "hardening" or hydration of the cement present these solids will not retain the shape of the mandrel, but will sag to varying extents depending upon a number of factors so as to assume other than the desired configuration.

The amount of such sag can be controlled by allowing a cement containing solids mixture to remain on a mandrel in the indicated type of process until such time as the mixture hydrates and becomes sufficiently hard so that substantially no sag is encountered. Commercially it is desired to reduce the time such a mixture remains on the mandrel as short a time as possible because of the costs involved in having a plurality of mandrels holding products which are hydrating in a plant.

In order to lessen the time required for a cement containing product to harden upon a mandrel to a sufficient extent that such a product can be removed without significant danger of deformation a number of different expedients have been suggested and used to varying extents. Thus, for example, it is known to partially cure such a mixture upon a mandrel through the use of steam or various other specialized gases. Such expedients are considered disadvantageous in a relative sense because of the fact that they primarily tend to affect the outer surface of the articles being created and do not provide a relatively uniform hardening within a comparatively short period throughout the thickness of an article.

An object of the present invention is to provide a new and improved method and apparatus for the hardening of cement mixtures in procedures of the general type indicated in the preceding discussion. Another object of this invention is to provide an apparatus as herein indicated which may be easily and conveniently constructed and used at a comparatively nominal cost. A further object of this invention is to provide a method which may be easily and conveniently carried out at a comparatively nominal cost, and which, if desired, may be used in conjunction with other known procedures for hardening a hydraulic cement containing product.

These and various other objects of this invention as well as many specific advantages of it will be more fully apparent from a detailed consideration of this specification—the appended claims and the accompanying drawing in which:

There is shown a schematic view of an apparatus of this invention.

Those skilled in the field pertaining to the hardening of cement mixtures will realize that the accompanying drawing is primarily intended to clearly illustrate for explanatory purposes a presently preferred apparatus of this invention, but that principles of this invention defined or summarized by the appended claims can be embodied within other differently constructed apparatus through the use of routine engineering skill or ability.

As an aid to understanding this invention, it can be indicated in essentially summary form that it concerns the application of the hot gaseous combustion products resulting from the burning of fuel to a hydraulic cement mixture containing water as such a mixture is being moved or handled, so as to be located upon a form or mandrel. An apparatus of the present invention differs from prior apparatus for locating such an essentially solids mixture upon a form or mandrel by including means for applying the hot gaseous combustion products resulting from the burning of fuel directly to such a mixture as it is being handled and/or located upon the form or mandrel.

The actual details of this invention can best be explained with reference to the accompanying drawing. Here there is shown an apparatus 10 of this invention which is used in obtaining a layer 12 of a hydraulic cement mixture containing water from a slurry 14 containing the solids within such a mixture and in locating this layer 12 upon the surface of a mandrel 16 having a desired cylindrical shape. The slurry 14 is normally contained within a slurry tank 18 which is contacted by means of a so-called "felt" 20 consisting of an endless belt of a porous material such as a common felt belt, a closely woven wire screen, a four denier wire or the like. The felt 20 travels around a first vacuum roller 22 which extends into the slurry tank 18, around another vacuum roller 24 and a drive roller 26. It is normally maintained taut by at least one idler and take-up roller 28. All of these rollers 22, 24, 26 and 28 are of a conventional type, and hence are not shown in extreme detail in the accompanying drawing.

As the felt 20 is moved through the tank 18 around the roller 22 a vacuum is continuously applied to the interior of this roller 22. As this happens some of the slurry 14 is drawn against the felt 20 and is filtered by this felt so as to create a solids mixture forming the layer 12. As the felt is moved, further water is withdrawn in the same general manner from the layer 12 by the vacuum roller 24 so that the layer 12 becomes a comparatively viscous, wet, paper-pulp-like mass which transfers to the mandrel 16 automatically as this mandrel contacts the layer 12 during the movement of the felt 20.

The mandrel 16 is preferably positioned immediately adjacent to the roller 32 in axial alignment to this roller so as to facilitate the winding of the layer 12 upon this mandrel. The mandrel 16 is, of course, rotated at the same speed at which the felt 20 is moved so as to avoid any "bunching up" of the layer 12 upon the mandrel 16. During this transfer operation the spacing of the mandrel 16 and the roller 32 tends to cause the layer 12 to be pressed into a desired final pipe-shaped body 30 upon this mandrel. If desired, a pressure roller 32 in axial alignment with the mandrel 16 may be rotated at the same speed as this mandrel in contact with the body 30 so as to aid in eliminating any voids or the like within this body.

In accordance with the present invention the apparatus 10 includes at least one fuel burner 34. Fuel burner 34 has a fuel supply line 36 and burner head 38. Fuel burner 34 is arranged to accept fuel and burn it with respect to air. The products of combustion of the burned fuel are directed by the burner head 38 in such a manner as to aid the rapidity of setting of the body of material 30 on mandrel 16. Thus, the burner head 38 is preferably directed to discharge the products of combustion into the bight between the layer of cement 12 and the body of material 30, as is shown in the drawings. Directing the products of combustion in this way distributes them to the exterior surface of the body 30 just prior to the point where the new layer is wound thereon, and directs them on to the interior of the layer 12 just before it is wound on the body 30. In this way only one fuel burner is needed to direct the products of combustion in this most favorable manner. If desired, however, the fuel burner 34 could be directed to the exterior surface of the body 30 while a similar burner is directed to the upper surface of the cement layer 12. In fact, all three of these positions could be used if so desired. However, the position of the fuel burner 34 as shown on the drawings is preferred as being the most effective position.

Natural gas is the preferred fuel supplied to fuel supply line 36. Gas is the preferred fuel because of its ease of control and ease of combustion. Natural gas is preferred because of its relatively high heat value as compared to some other fuel gases. Other fuels, such as oil or powdered coal can be supplied through the fuel supply line 36 as long as they are provided for by proper equipment to properly burn the fuel and deliver the products of combustion. In each case the fuel is preferably burned with an excess of air so as to provide the maximum quantity of carbon dioxide in the products of combustion with a minimum quantity of carbon monoxide.

The products of combustion emitted from burner head 38 contains two major constituents, carbon dioxide and water vapor and the products of combustion are quite hot. When the layer of cement 12 has had a considerable amount of water removed therefrom by vacuum rollers 22 and 24, it may have insufficient water present to supply the hydration needs for the complete setting of the cement after it is wound into the body 30 upon mandrel 16. This additional water vapor can be arranged to condense at least to a certain extent so as to add additional water for completion of hydration. However, the two other factors resulting from the fuel burning are of greater significance to the quick setting of the body 30 upon the mandrel 16. The heat added by the products of combustion raises the temperature of the body 30, as it is wound, and this increased temperature reduces the time before the beginning of the initial set and reduces the time of setting between the beginning of the initial set and the final set of the body 30.

Furthermore, the application of carbon dioxide gas, as part of the products of combustion, to the cement layer 12 and the body 30 also reduces the setting time both to the beginning of the initial set and the time interval from the initial set to final set. Carbon dioxide tends to react with compounds such as free lime (CaO) within this mixture so as to form precipitates such as calcium carbonate which give strength and a degree of solidity to the mixture. For some unknown reason the $CO_2$ gas "triggers" a hardening reaction within the cement gel as is noted by a sharp rise in temperature due to a $CO_2$ reaction. This rise in temperature then in itself further helps accelerate the hardening of the cement gel and causes the product to become quickly rigid. As a consequence of these factors, the body 30 created upon the mandrel 16 is of physically stronger character than if these products of combustion are not used. This in turn enables the body 30 to be further processed and removed from the mandrel 16 at an earlier time than if the products of combustion were not utilized.

There will be impurities in the products of combustion. These impurities, an addition to the prime products of water vapor and carbon dioxide, are carbon monoxide, incompletely burned fuel materials, sulphur dioxide and in the cases of liquid or solid fuels there will be some ash. None of these materials are harmful to the cement product, except that sulphur dioxide in appreciable quantities will retard the setting of the cement mixture. However, there is not sufficient sulphur in the normal fuel materials described above to provide a sufficient quantity of sulphur dioxide to have a detectable effect upon the rate of setting. The use of fuels having an uncommonly high amount of sulphur content should be avoided, however.

The present invention is considered to be particularly applicable to the manufacture of so-called "cement" pipe consisting of a mixture of conventional Portland cement and fine silica and asbestos fibers such as a mixture consisting of 40–60% by weight any conventional Portland cement such as type I Portland cement, 25–35% by weight silica flour and 15–25% by weight asbestos fiber. With the use of this invention it is possible to obtain satisfactory products utilizing types of cement which have previously not been employed in the general type of process herein explained because of the slowness at which such cements exhibit an initial set or hardness. The use of this invention also makes it possible to improve the economics of the production of cement articles by such means as lowering the number of rejects or seconds produced, by reducing the time for the production of said articles and by lessening the amount of equipment required to hold such articles as they are "stiffened" or becoming sufficiently hard so that they are capable of being removed from a form or mandrel without sagging.

It is to be particularly noted that the present invention concerns a localized application of the products of fuel combustion in such a manner that substantially the entire contents of body 30 formed on the mandrel 16 is thoroughly contacted thereby so that it is effective substantially uniformly throughout the thickness of the body.

Because of the nature of this invention it is to be considered as being limited solely by the appended claims forming a part of this disclosure.

What is claimed is:

1. In a process of manufacturing a Portland cement product in which a layer of a Portland cement mixture containing water is located upon a supporting surface and is transferred from said supporting surface to a form having a shape corresponding to the shape of said product, the improvement which comprises:

applying hot gaseous products resulting from combustion of carbon-containing fuel to said mixture prior to the hydration of the cement in said mixture as said mixture is being handled so as to be located upon said form.

2. A process as defined in claim 1 wherein said hot gaseous products are applied to both surfaces of said layer as said layer is being transferred to said form.

3. A process of manufacturing a Portland cement product comprising the steps of:

vacuum depositing a layer of Portland cement containing mixture from a slurry on to a supporting surface;

transferring the layer of Portland cement containing mixture;

winding a body of material on to a mandrel from multiple layers of the transferred layer;

directing the hot gaseous products resulting from combustion of carbon containing fuel onto said layer and onto said body adjacent the point where the layer winds upon said body;

allowing said body of material to a least partially set while positioned upon said mandrel; and removing said mandrel from said body so as to leave a hollow Portland cement containing body.

4. The process of claim 3, further including as a second step:

further vacuum extracting water from the layer of material.

5. An apparatus for locating a hydraulic cement mixture containing water in the shape corresponding to the shape of a product which comprises:

means for forming a layer of a hydraulic cement mixture containing water from a slurry;

mold means;

means for transferring the layer onto said mold means; and means for applying hot gaseous products resulting from combustion of carbon-containing fuel to said layer as said layer is being moved from said slurry to said mold means.

6. An apparatus for making a hydraulic cement containing article, said apparatus comprising a slurry tank adapted to contain a slurry mixture comprising hydraulic cement and water;

first and second vacuum rolls, a drive roll and an idler roll, a porous belt extending around said first and second vacuum rolls, said drive roll and said idler roll, said first vacuum roll being positioned at least partially within said slurry tank so that upon rotation of said drive roll said belt passes around said first vacuum roll and through said slurry tank, passes around said second vacuum roll, said drive roll and said idler roll;

a mandrel located adjacent said drive roll and arranged so that said belt passes between said drive roll and said mandrel;

fuel burner means positioned adjacent said belt and said mandrel, fuel supply means to supply fuel to said fuel burner means, said fuel burner means being directed to discharge hot gaseous products of combustion of carbon containing fuel adjacent said belt and said mandrel so that when said first vacuum roll draws hydraulic cement containing slurry onto said belt and said second vacuum roll withdraws further water from the slurry which lies as a layer of cement containing material on the belt, said burner means discharges hot gaseous products of combustion containing carbon dioxide onto the layer of material on the belt and on to the material after it is wound from said belt onto said mandrel to increase the speed of setting of the body of material on said mandrel.

7. An apparatus for locating a hydraulic cement mixture containing water in the shape corresponding to the shape of the product which comprises:

means for forming a layer of hydraulic cement mixture containing water from a slurry;

mold means;

means for transferring the layer upon said mold means; and means for applying hot gaseous products resulting from combustion of carbon-containing fuel to said layer as said layer is being moved from said slurry to said mold means, said means for applying hot gaseous combustion products comprising a fuel supply line connected to a burner head so that said burner head is able to burn fuel supplied by said fuel supply line and is able to emit the hot gaseous products of combustion, said burner head being positioned so as to direct the hot gaseous combustion products and heat adjacent said means for transferring said layer and adjacent said mold means so that when the layer is transferred by said transferring means onto said mold means the hot gaseous combustion products are delivered at the juncture thereof.

References Cited by the Examiner

UNITED STATES PATENTS 2,177,643  10/1939  Ferla.

ALEXANDER H. BRODMERKEL, *Primary Examiner.*

J. H. WOO, *Assistant Examiner.*